United States Patent [19]

Nakazawa

[11] Patent Number: 5,346,779
[45] Date of Patent: Sep. 13, 1994

[54] FUEL REFORMING METHOD AND APPARATUS FOR POWER GENERATION SYSTEM USING FUEL CELLS

[75] Inventor: Kenzo Nakazawa, Yokohama, Japan

[73] Assignee: Ishikawajima-Harima Heavy Industries Co., Ltd., Tokyo, Japan

[21] Appl. No.: 78,556

[22] Filed: Jun. 16, 1993

[30] Foreign Application Priority Data

Jun. 25, 1992 [JP] Japan .................................. 4-190118

[51] Int. Cl.$^5$ .......................................... H01M 8/06
[52] U.S. Cl. ...................................... 429/19; 429/20; 429/34
[58] Field of Search ..................... 429/19, 17, 16, 20, 429/21, 34, 26

[56] References Cited

U.S. PATENT DOCUMENTS

| | | | |
|---|---|---|---|
| 3,962,411 | 6/1976 | Setzer et al. | 423/651 |
| 4,729,931 | 3/1988 | Grimble | 429/17 |
| 4,812,373 | 3/1989 | Grimble | 429/19 |
| 5,068,159 | 11/1991 | Kinoshita | 429/16 |
| 5,082,751 | 1/1992 | Reichner | 429/19 |
| 5,221,586 | 6/1993 | Morimoto et al. | 429/20 |

FOREIGN PATENT DOCUMENTS

| | | |
|---|---|---|
| 0404712 | 12/1990 | European Pat. Off. . |
| 0476610 | 3/1992 | European Pat. Off. . |
| 1347306 | 11/1963 | France . |
| 61-10877 | 1/1986 | Japan . |
| 61-19073 | 1/1986 | Japan . |
| 4161244 | 6/1992 | Japan . |
| 2025118 | 1/1980 | United Kingdom . |

OTHER PUBLICATIONS

Patent Abstracts of Japan, vol. 10, No. 377 (C-392)(2434) Dec. 16, 1986.
Patent Abstracts of Japan, vol. 12, No. 252 (C-512)(3099) Jul. 15, 1988.
Patent Abstracts of Japan, vol. 16, No. 362 (C-971) Aug. 5, 1992.
Patent Abstracts of Japan, vol. 13, No. 124 (C-580)(3472) Mar. 27, 1989.
Patent Abstracts of Japan, vol. 16, No. 455 (C-987) Sep. 22, 1992.
Patent Abstracts of Japan, vol. 10, No. 168 (E-411)(2224) Jun. 14, 1986.
Patent Abstracts of Japan, vol. 10, No. 150 (E-408)(2207) May 31, 1986.
Chemicals Abstracts, 117 (1992) Oct. 19, No. 16, 117:154498q.

*Primary Examiner*—Anthony Skapars
*Attorney, Agent, or Firm*—Trexler, Bushnell, Giangiorgi & Blackstone, Ltd.

[57] ABSTRACT

A reformer arrangement is provided for a fuel cell power generation system in which a raw material gas is reformed with steam to a fuel gas and the fuel gas is fed to a fuel electrode of a fuel cell for power generation. This reformer arrangement includes a main reformer for reforming the raw material gas to the fuel gas; a fuel cell for receiving the fuel gas to cause the power generation and to produce steam; and a second reformer for reforming with the steam non-reformed raw material gas discharged from the fuel electrode. In one embodiment, the second reformer includes a cylindrical or tubular main body. An entrance for the gas discharged from the fuel electrode is formed at one end of the main body, and an exit for the gas is formed at the other end of the main body. The reforming catalyst is placed in a space between the gas entrance and exit, and a lid is provided at one or both ends of the main body for loading and unloading of the reforming catalyst. In another embodiment, the reforming catalyst is divided into several blocks in the main body of the second reformer so that a block which is damaged by a carbonate is replaceable by new one. In still another embodiment, the second reformer has a double-cylinder structure. The reforming catalyst is placed in an inner cylinder or a inspace between the inner and outer cylinders. The inner cylinder or the space which does not carry the reforming catalyst is used as a passage for discharging the gas from the second reformer, and one end of the inner cylinder is communicated with one end of the outer cylinder.

16 Claims, 6 Drawing Sheets

FUEL REFORMING METHOD AND APPARATUS FOR POWER GENERATION SYSTEM USING FUEL CELLS

BACKGROUND OF THE INVENTION

1. Technical Field

The present invention relates to fuel gas reforming method and apparatus for a power generation system using a fuel cell which directly converts chemical energy of fuel into electric energy, and particularly to reforming method and apparatus which can improve a reforming conversion ratio of the fuel to raise a power generation efficiency.

2. Background Art

A power generation system using a molten carbonate fuel cell stack is known in the art. Generally, the molten carbonate fuel cell stack includes a plurality of cell elements and each cell element includes an electrolyte plate (tile), a fuel electrode and a oxygen electrode (air electrode). The electrolyte plate of the molten carbonate fuel cell is made from a porous material soaked with a molten carbonate. The fuel and oxygen electrodes sandwich the electrolyte plate, and a fuel gas is supplied to the fuel electrode and an oxidizing gas is supplied to the oxygen electrode for power generation. A plurality of cell elements are piled up with separators being interposed between each two adjacent cell elements.

Conventionally, a hydrocarbon such as methane, LPG and naphtha is used as a raw material gas for the fuel gas fed to the fuel electrode of the molten carbonate fuel cell power generation system. The hydrocarbon is reformed with steam to obtain the fuel gas. In the reforming operation, the steam is mixed with the raw material gas in the mol ratio of 2-4:1 (steam:raw material gas) and the mixture is heated to a temperature of 600°-900° C. with a reforming catalyst. The mixture contacts the reforming catalyst during the reformation.

On the other hand, preheated air or exhaust gas (the fuel gas is burned and used as a heating source for the reformer and a combustion gas is discharged from the reformer as the exhaust gas) is fed to the air electrode as the oxidizing gas.

Figure 9:
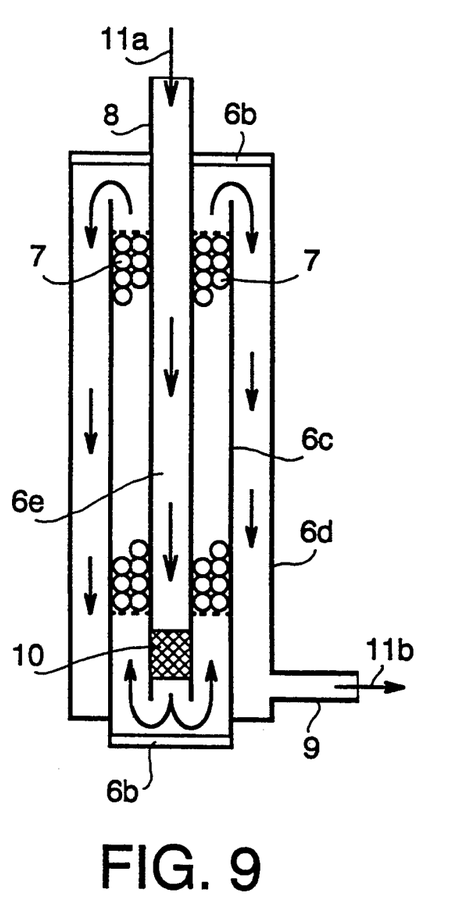
FIG. 9 shows still another modification of the reformer of FIG. 6.

A fundamental operation of a conventional molten carbonate fuel cell is shown in FIG. 9 of the accompanying drawings. A raw material gas $C_4$ ($C_4$ is used as a representative of the raw material gas in the following description.) is reformed to $H_2$ and $CO$ by a reformer 1 and the fuel gas FG ($H_2$ and $CO$) are supplied to a fuel electrode 4 from the reformer 1. Meantime, an oxidizing gas OG is fed to an oxygen electrode 3 and a following reaction takes place:

$$CO_2 + \tfrac{1}{2}O_2 + 2e^- \rightarrow CO_3^-$$

Upon this reaction, a carbonate ion $CO_3^-$ is produced and the carbonate ion $CO_3^-$ migrates in the electrolyte plate 2 to reach the fuel electrode 4. Approximately at the same time, the fuel gas FG is fed to the fuel electrode 4 to cause a following reaction:

$$CO_3^- + H_2 \rightarrow H_2O + CO_2 + 2e^-$$

The gas from the reformer 1 only contributes to the reactions in the molten carbonate fuel cell I and $CH_4$ (raw material gas) is not reactive. Therefore, the ratio of $CH_4$ in the fuel gas FG supplied to the fuel electrode 4 directly influence the power generation efficiency of the fuel cell. More specifically, it is desired to reduce the amount of methane remaining after the reforming reaction (remaining raw material gas) as small as possible. In other words, it is desired to raise the reforming conversion ratio to 100% as close as possible.

During the methane reforming reaction in the reformer 1, various reactions occur simultaneously, but actually considering following two major reactions are satisfactory:

$$CH_4 + H_2O \rightarrow CO + 3H_2 \tag{1}$$

$$CO + H_2O \rightarrow CO_2 + H_2 \tag{2}$$

It is known that the amount of $CH_4$ existing after the $CH_4$ reforming reaction is reduced as a reaction pressure drops and/or a reaction temperature rises. The reforming reaction (1) is an endothermic reaction and the CO shift reaction (2) is an exothermic reaction, but the reaction in the reformer 1 is an endothermic reaction as a whole. Therefore, it is required to heat the reformer.

In terms of thermal economy, the ratio of steam to $CH_4$ (S/C ratio: "R" is used to represent this ratio in the following.) should be maintained as low as possible to obtain $CH_4$ of desired concentration. In a case where the $CH_4$ concentration is 10% at the exit of the reformer, a relation between the pressure and the temperature draws a curve as shown in FIG. 11 of the accompanying drawings, with a parameter being R.

Figure 11:
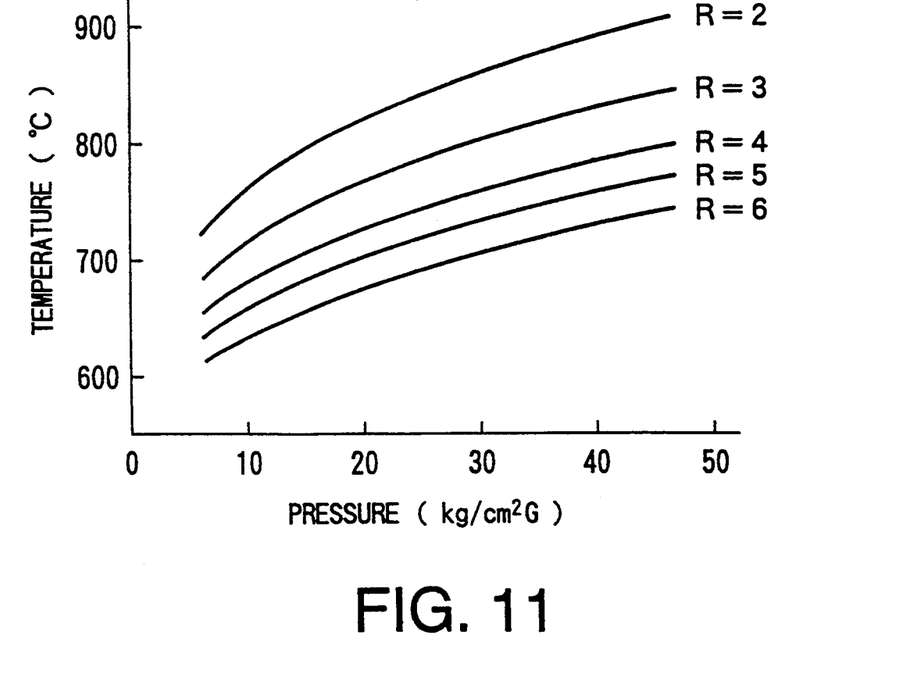
FIG. 11 depicts a relation between reforming temperature and pressure when a methane concentration at a reformer exit is 10%.

It is understood from FIG. 11 that the reforming temperature should be raised to realize a constant $CH_4$ concentration if the R is fixed and the reforming pressure is raised. Therefore, generally a high nickel alloy (e.g., 25Cr—20Ni) is used as a material for the reformer 1 to bear a high temperature and a high pressure. However, the elevated temperature considerably reduces the longevity of the material. Generally, 950°-1,000° C. is considered as a maximum temperature for the material.

Since the reactions (1) and (2) in the reformer proceed almost simultaneously, they can be combined to a following equation (3) for simplification and such an approximation does not affect the principle of the invention:

$$CH_4 + 2H_2O \rightarrow CO_2 + 4H_2 \tag{3}$$

In the following description, it is supposed that the reaction (3) takes place in the reformer 1. The increase of $CO_2$ upon the reaction in the fuel cell I rather promotes the reforming reaction, and calculation results show that the reforming becomes easier if the increase of the $CO_2$ is taken in account than not. Therefore, the increase of $CO_2$ is neglected in the following description since such neglectedness does not affect the effectivity of the invention.

The power generation efficiency A of the fuel cell power generation system is determined by a product of the reforming conversion ratio B of the reformer 1 and a power generation factor C of the fuel cell I of FIG. 9. This can be expressed by a following equation:

$$A = B \times C$$

Therefore, it is desired to raise the reforming conversion ratio B as high as possible to raise the power generation efficiency of the fuel cell power generation system (total power generation efficiency) A. To raise the reforming conversion ratio B, however, the pressure or the temperature should be raised, as mentioned earlier.

Figure 12:
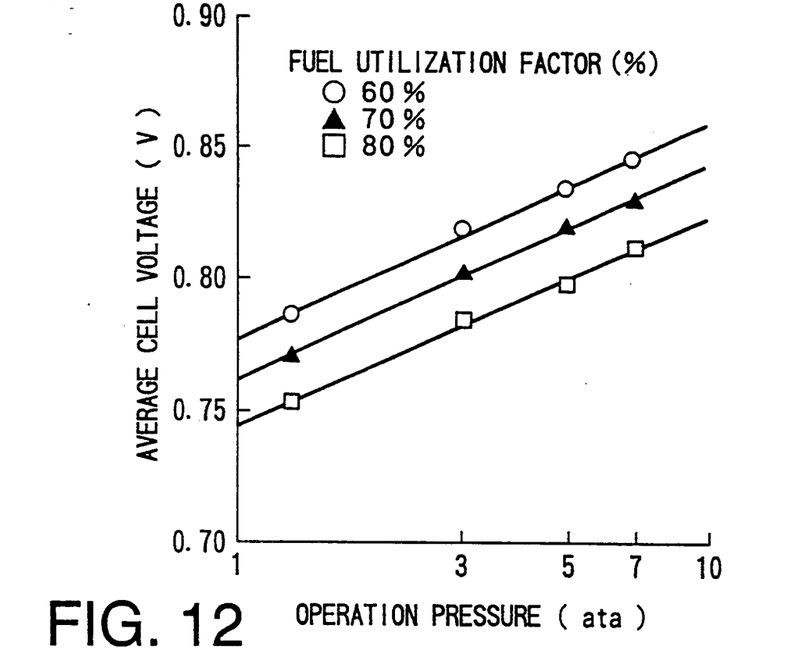
FIG. 12 depicts a relation between a system pressure and a power generation efficiency of a fuel cell.

On the other hand, raising the system pressure results in raising the power generation factor C of the fuel cell I, as shown in FIG. 12 of the accompanying drawings. However, the reforming conversion ratio B drops as the system pressure rises.

Figure 13:
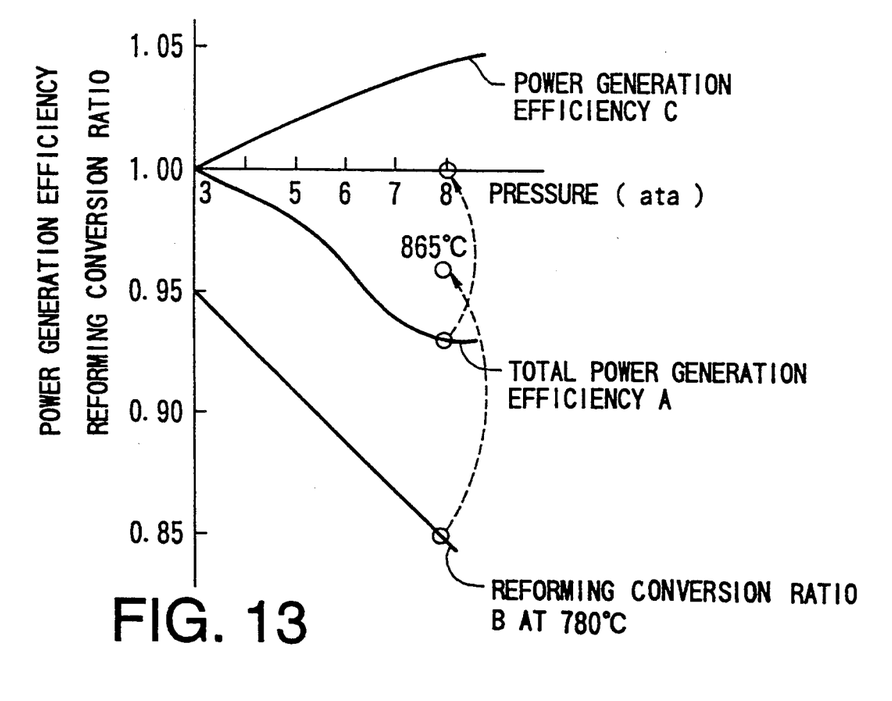
FIG. 13 depicts a relation between a pressure and a power generation efficiency and that between the pressure and a reforming conversion ratio when the reforming temperature is maintained constant.

In a case where the reforming temperature is maintained at 780° C., for example, the reforming conversion ratio B drops with the rising pressure, as shown in FIG. 13 of the accompanying drawings. As a result, the total power generation efficiency A is deteriorated. At the pressure of 8 ata, the reforming temperature should be 865° C. or more and the value (reforming conversion ratio) of the reforming conversion ratio B should be 0.96 (96%) or more to obtain the total power generation efficiency A better than a case of 3 ata. To realize the 99% reforming conversion ratio, the reforming temperature should be further raised. This raises problems relating to the material and structure of the reformer 1.

SUMMARY OF THE INVENTION

An object of the present invention is to provide reforming method and apparatus for a fuel cell power generation system which can improve the reforming conversion ratio even at a high pressure or even at a reforming temperature below 900° C.

In a method according to the present invention, a non-reformed raw material gas remaining in a gas discharged from a fuel electrode of a fuel cell (a raw material gas is reformed by a main reformer, but all the raw material gas is not reformed by a reforming reaction in the main reformer. The reformed gas and non-reformed raw material gas are fed to a fuel electrode of a fuel cell, and gases which contain the non-reformed raw material gas are discharged from the fuel electrode.) is reformed in a second reformer with steam obtained upon a reaction at the fuel electrode and sensible heat of the gas discharged from the fuel electrode. This method reduces an amount of remaining raw material gas.

A reforming catalyst is placed in a container (second reformer), a gas is introduced to one opening of the container from an exit of a fuel electrode of a fuel cell such that the gas contacts the reforming catalyst, and this gas is discharged from another opening of the container. The container may be shaped like a cylinder or a tube, with a plug being provided at one or both of ends of the container for replacement of the reforming catalyst.

The reforming catalyst may be divided into several segments in the container so that a particular segment can be replaced by new one. In addition, the container may have a double or triple cylinder structure. In case of double cylinder structure, the space between the outer and inner cylinders is filled with the reforming catalyst. Further, a carbonate absorber may be placed in the vicinity of an entrance of the container or a certain place upstream of the reforming catalyst so that the gas from the fuel electrode flows through the carbonate absorber and then contacts the reforming catalyst.

Since the gas discharged from the fuel electrode of the fuel cell is further reformed in the second reformer, it is possible to reduce the amount of non-reformed raw material gas remaining after the first reformation in the upstream main reformer. Accordingly, even if the reforming conversion ratio of the main reformer itself is low, the power generation system as a whole can have a higher reforming conversion ratio. Since the reformation of the non-reformed raw material gas is carried out with the steam produced upon the reaction at the fuel electrode and the sensible heat or the discharged gas, the apparatus can have a simple structure.

If a thermal expansion or shrinkage of the container (second reformer) should be taken in account due to a large temperature difference, the container may be adapted to be able to elongate or shrink in a longitudinal direction of the container. The container becomes elongatable if mechanical restrictions are not provided in its longitudinal direction.

A carbonate vapor, which degrades the reforming catalyst, is contained in the gas discharged from the fuel electrode. Regarding this, the reforming catalyst is divided into smaller pieces so that it is possible to pick up and replace the deteriorated piece only. Further, if a double cylinder structure is employed and the catalyst is placed in the space between the inner and outer cylinders or in the inner cylinder, the gas from the fuel electrode may be forced into the space between the inner and outer cylinders and then into the inner cylinder by a 180-degree turn or vice versa for a regenerative heat exchange. In such a case, the reforming catalyst or a reforming chamber is heated by the gas just discharged from the fuel electrode so that the temperature of the reforming chamber can be maintained at a high value. At the same time, the gas discharged from the fuel electrode looses the heat and then the gas temperature becomes low. Providing the carbonate absorber upstream of the reforming catalyst prevents the deterioration of the reforming catalyst.

BRIEF DESCRIPTION OF THE DRAWINGS

FIG. 5 is a set of sectional views showing examples of the reformer of regenerative heat exchange type, in which

DETAILED DESCRIPTION OF THE PREFERRED EMBODIMENTS

Now, preferred embodiments of the present invention will be described with the accompanying drawings.

Figure 1:
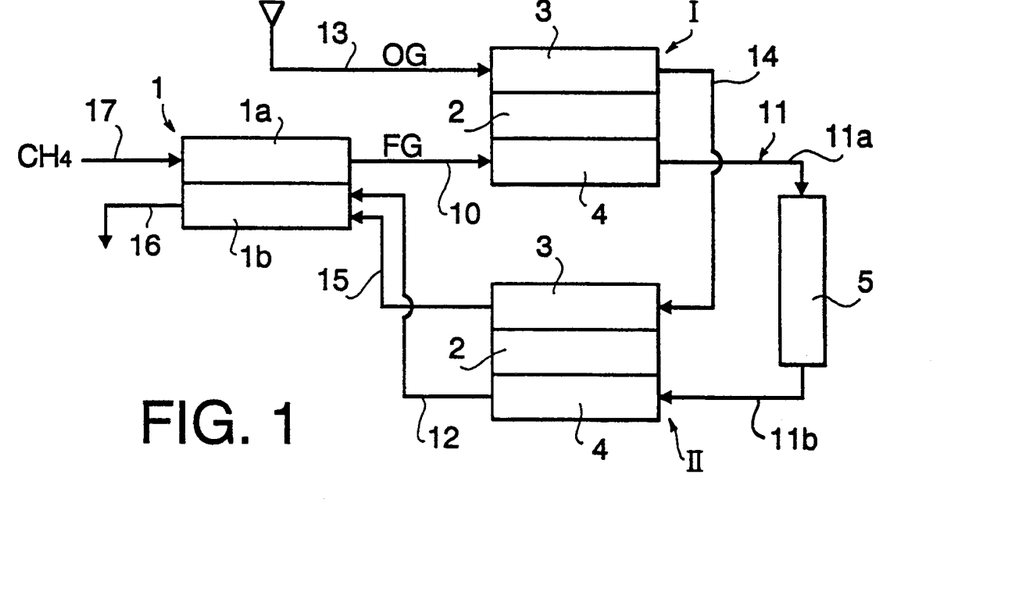
FIG. 1 shows a system diagram which includes one embodiment of a reformer according to the present invention.

Referring first to FIG. 1, illustrated is a power generation system using a molten carbonate fuel cell. Numerals I and II generally represent a fuel cell stack, but in the following description, these numerals sometimes represent only one cell element in the fuel cell stack for easier understanding.

Fundamentally, two Fuel cells I and II are connected in series, a main reformer 1 is connected with the upstream fuel cell I and a second reformer 5 is provided on a line extending between the two fuel cells I and II.

Figure 10:
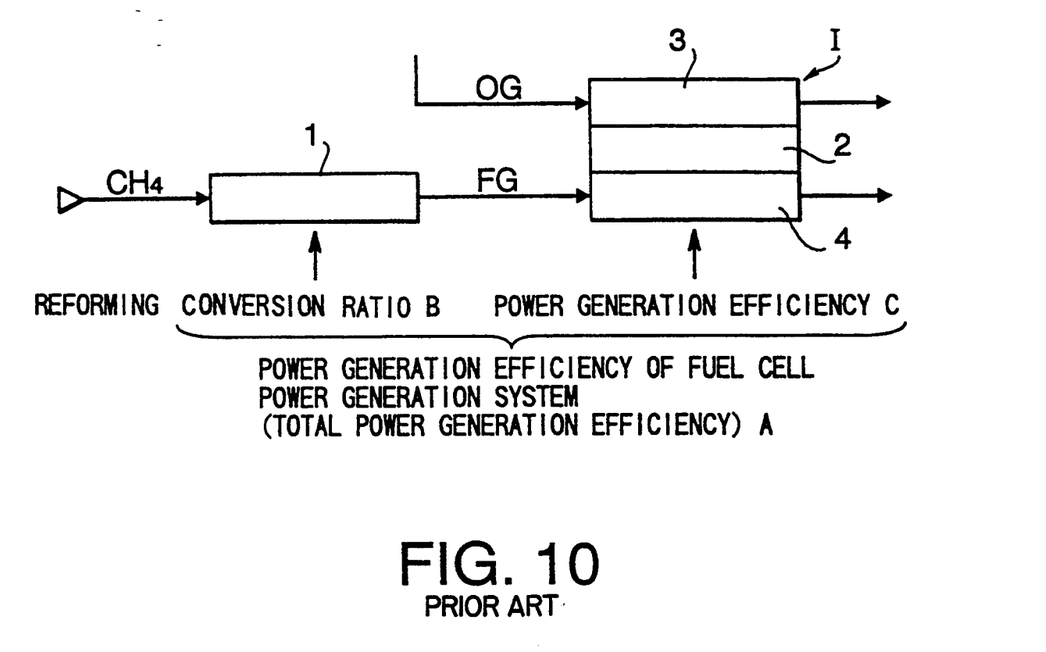
FIG. 10 shows part of a conventional power generation system using a fuel cell.

Like the fuel cell explained in connection with FIG. 10, the fuel cell stack I (or II) includes a plurality of fuel cell elements stacked via separators and each fuel cell element includes an electrolyte plate 2, a fuel electrode 4 and an oxygen electrode 3. The electrolyte plate 2 is sandwiched by the two electrodes 4 and 3.

The main reformer 1 includes a reforming chamber 1a and a combustion chamber 1b.

The reforming chamber 1a of the main reformer 1 and the fuel electrode 4 of the fuel cell I are connected with each other by a fuel gas line 10 to feed a fuel gas FG to the fuel electrode 4. An exit of the fuel electrode 4 of the upstream fuel cell I and the fuel electrode 4 of the downstream fuel cell II are connected with each other by the anode gas line 11, As mentioned above, the second reformer is provided on the anode gas line 11, The fuel electrode 4 of the fuel cell II is connected with the combustion chamber 1b of the main reformer 1 by an anode exhaust gas line 12.

An oxidizing gas line 13 is connected to the oxygen electrode 3 of the upstream fuel cell I. An oxidizing gas OG is fed to the oxygen electrode 3 of the fuel cell I by the line 13, The oxidizing gas OG from the exit of the oxygen electrode 3 is supplied to the oxygen electrode 3 of the downstream fuel cell II by a line 14. A gas from the oxygen electrode 3 (referred to as "cathode exhaust gas") is introduced to the combustion chamber 1b of the main reformer 1 by a cathode exhaust gas line 15. A combustion exhaust gas line 16 extends from the combustion chamber 1b of the main reformer 1.

Methane $CH_4$ (raw material gas) and steam $H_2O$ are fed to the reforming chamber 1a of the main reformer 1 by a raw material gas line 17, and a reforming reaction is caused by a reforming catalyst placed in the reforming chamber 1a. As a result, a fuel gas FG is produced and supplied to the fuel electrode 4 of the upstream fuel cell I. On the other hand, the oxidizing gas OG is fed to the oxygen electrode 3 of the upstream fuel cell I for a cell reaction.

A gas from the fuel electrode 4 (referred to as "anode exhaust gas") of the upstream fuel cell I contains not only non-reformed raw material gas but non-reacted methane which is not used for the reaction in the main reformer 1. The anode exhaust gas undergoes a reforming reaction in the second reformer 5 with a sensible heat of the anode exhaust gas. After that, the gas is introduced to the fuel electrode 4 of the downstream fuel cell II whereas the oxidizing gas from the oxygen electrode 3 of the upstream fuel cell I is fed to the oxygen electrode 3 of the downstream fuel cell II for a cell reaction.

The anode exhaust gas from the fuel electrode 4 of the downstream fuel cell II still contains a non-reformed raw material gas. The remaining raw material gas is burned in the combustion chamber 1b with oxygen contained in the oxidizing gas fed from the oxygen electrode 3 of the downstream fuel cell II to maintain a reforming temperature of the reforming chamber 1a.

In the foregoing, the non-reformed raw material gas (methane still remaining after the reforming reaction in the upstream reformer 1) which is contained in the gas discharged from the fuel electrode 4 of the fuel cell I (fuel electrode exit gas) is reduced by another reforming reaction in the second reformer 5. Therefore, a reforming conversion ratio of a system as a whole is raised. The second reformer 5 only includes a reforming chamber.

Figure 2:
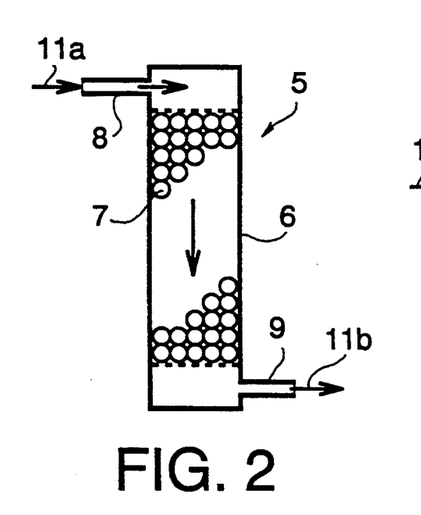
FIG. 2 shows the reformer of FIG. 1.

Referring to FIG. 2, the second reformer 5 connected to the anode gas line 11 (11a and 11b) has a cylindrical container 6. The reforming catalyst 7 is placed in the container 6, and a gas entrance 8 is formed at one end of the container 6 while a gas exit 9 is formed at the other end of the container 6.

The gas entrance 8 of the second reformer 5 of FIG. 2 is connected to the upstream anode gas line 11a extending from the fuel electrode 4 of the fuel cell I and the gas exit 9 of the same is connected to the downstream anode gas line 11b.

The second reformer 5 is provided to reform the non-reformed raw material gas contained in the gas which is not reformed by the upstream main reformer 1 and discharged from the fuel electrode 4 of the fuel cell I. This reforming reaction is carried out by introducing the anode gas discharged from the fuel electrode 4 into a catalyst area in the container 6 to cause the contact of the anode gas with the reforming catalyst 7. During this contact, the remaining methane contained in the anode gas is reformed with the steam $H_2O$ produced upon the cell reaction at the fuel electrode 4 and the sensible heat of the anode gas. This second reforming reduces the methane remaining in the gas discharged from the gas exit 9 of the container 6 thereby improving the reforming conversion ratio as a whole.

The second reformer 5 can improve the reforming conversion ratio by performing the secondary reforming. In an actual case, however, the reforming conversion ratio cannot be calculated directly from the amount of remaining methane.

Specifically, hydrogen $H_2$ produced in the upstream main reformer 1 is partially consumed in the fuel cell I for the power generation on one hand and $H_2O$ and $CO_2$ increase on the other hand. In the second reformer 5, since the forming reaction occurs at a high S/C (=R) ratio, the reforming is promoted considerably.

This is equivalent to that the S/C ratio of the gas fed to the main reformer 1 is set to a high value at the beginning. The higher the S/C ratio is, the easier the reforming reaction takes place.

Here, the amount of $H_2$ among the anode gas is converted to the amount of before-the-reformation methane, and this value is added to the amount of methane remaining in the anode gas to obtain an equivalent methane amount. At the same time, the amount of $H_2O$ required for reforming the amount of above-mentioned $H_2$ is calculated and added to the amount of $H_2O$ existing in the exhaust gas (gas discharged from the fuel cell I) to obtain an equivalent steam amount. Then, if the S/C ratio, i.e., an equivalent S/C ratio, which is equal to equivalent steam amount/equivalent methane amount, is represented by "R" and a ratio of the equivalent methane amount to a supplied methane amount at the main reformer entrance is called an equivalent methane ratio and represented by "p", the equivalent methane ratio p can be expressed by a following equation:

$$p = 1 - Z \qquad (5)$$

where $Z = ur1$, $r1$ is a reforming conversion ratio of the main reformer 1 and u is a fuel utilization factor in the first fuel cell I. Here, the fuel utilization factor is given by a following equation:

Fuel utilization factor = $H_2$ consumed in fuel electrode/$H_2$ fed to fuel electrode The equivalent methane ratio p is expressed by such a simple equation since the consumption of $H_2$ during the reaction in the fuel cell I produces the same amount of $H_2O$ and $CO_2$ so that the total amount of $H_2$ and $H_2O$ in the gas is always constant.

If the amount of supplied methane is represented by "M", the equivalent methane amount is represented by "P", the equivalent steam amount is represented by "Q" and the equivalent S/C ratio is represented by "R", the equivalent methane amount "P" can be expressed by a following equation:

$$P = (1 - r1)M + (1 - u)r1M$$

Since the equivalent methane ratio p is P/M, it can be expressed by:

$$\begin{aligned} p &= \{(1 - r1)M + (1 - u)r1M\}/M \\ &= (1 - r1) + (1 - u)r1 \\ &= 1 - r1 + r1 - ur1 \\ &= 1 - ur1 \\ &= 1 - Z \end{aligned}$$

where $Z = ur1$.

On the other hand, the equivalent steam amount Q can be expressed by:

$$\begin{aligned} Q &= 4ur1 + (3 - 2r1) + 4r1(1 - u)/2 \\ &= 4ur1 + 3 - 2r1 + 2r1 - 2r1u \\ &= 2ur1 + 3 \\ &= 2Z + 3 \end{aligned}$$

where $Z = ur1$.

Further, if the reforming conversion ratio of the second reformer 5 is represented by "r2" and the total reforming conversion ratio of the combination of the main and intermediate reformers 1 and 5 is represented by "rt", the total reforming conversion ratio rt is given by a following equation:

$$rt = Z(1 - r2) + r2$$

where $Z = ur1$.

If the amount of methane remaining after the second reformer 5 is represented by "W", it is given by a following equation:

$$W = P(1 - r2)$$

Since the total reforming conversion ratio is (1 − remaining methane amount W/supplied methane amount M), $$1 - rt = W/M = P(1 - r2)/M$$

On the other hand, $$\begin{aligned} P &= (1 - r1)M + (1 - u)r1M \\ &= (1 - Z)M \end{aligned}$$

Therefore, $$\begin{aligned} 1 - rt &= (1 - Z)(1 - r2) \\ rt &= 1 - (1 - Z)(1 - r2) \\ &= Z(1 - r2) + r2 \end{aligned}$$

Here, the inventor introduces concept of equivalent methane ratio and equivalent S/C ratio and carried out the reformation under conditions shown below. This resulted in a higher reforming conversion ratio as a whole.

If a conventional reformer is used as the main reformer shown in FIG. 1, the S/C ratio (steam/methane ratio supplied to the reformer 1) is 3:1 and the system pressure is 8 ata, the reforming conversion ratio is about 95% and the temperature is 850° C. or more. If a higher reforming conversion ratio is desired, the reformation should be conducted at a temperature higher than 900° C. On the other hand, the present invention can provide a higher reforming conversion ratio at a lower temperature.

In an experimental reforming operation in the system of the present invention, the S/C ratio at the upstream main reformer 1 was set to 3 and the system pressure was set to 8 ata, like the above case. In the experiment, further, the reforming temperature at the main reformer 1 was set to 780° C., the fuel utilization factor of the upstream fuel cell I was set to 80%, the gas temperature at the fuel electrode exit was set to 680° C., the equivalent methane ratio at the second reformer 5 was set to 32%, the equivalent S/C ratio was set to 13.6 and the reforming temperature was set to 660° C. The resultant was: the reforming conversion ratio at the upstream reformer 1 was 84.6%, that at the downstream reformer 5 was 97% and the total reforming conversion ratio was 99%.

Next, another experiment was conducted under following conditions: the S/C ratio at the upstream reformer 1 was 3.5, the system pressure was 2.7 ata, the fuel utilization factor of the upstream fuel cell I was 70%, the gas temperature at the fuel electrode exit was 680° C., the equivalent methane ratio at the second reformer 5 was 44%, the equivalent S/C ratio was 10.5 and the reforming temperature was 660° C. The resultant was: the reforming conversion ratio at the main reformer 1 was 80%, that of the second reformer 5 was 97.5% and the total reforming conversion ratio was 98.9%.

The above examples only show a couple of embodiments of the present invention and do not limit the scope of the present invention.

Figure 3:
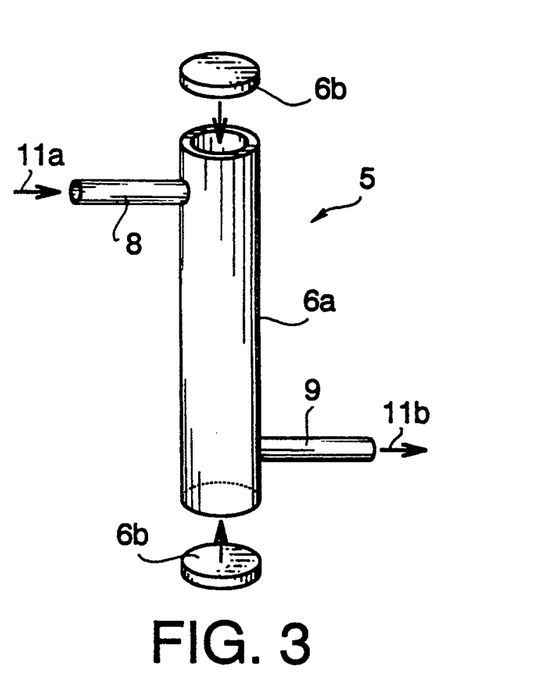
FIG. 3 is a perspective view showing another example of the reformer according to the present invention.

FIG. 3 illustrates a modification of the container 6 of the second reformer 5. Specifically, the container 6 includes a main body 6a and a lip 6b. The main body 6a is shaped like a cylinder or a tube and filled with the reforming catalyst. The lid 6b is provided at one or both ends of the main body 6a (FIG. 3 shows a case where two lids 6b are provided at two ends.) for loading and unloading the reforming catalyst.

The gas discharged from the fuel electrode 4 of the upstream fuel cell I contains a carbonate steam which damages the reforming catalyst. Therefore, if the gas from the fuel electrode 4 is introduced to the container 6 and contacts the reforming catalyst for the reformation (the sensible heat of the gas from the fuel electrode 4 is necessary for the reformation in the container 6.), at least part of the reforming catalyst may be deteriorated.

Measures for the catalyst deterioration are: (1) to replace the damaged catalyst with new one; and (2) to perform the regenerative heat exchange in the container 6 to lower the temperature to about 450° C. thereby condensing the carbonate vapor. The condensed carbonate is removed from the gas while maintaining the exit temperature of the reformer 5 at a high value. The embodiment of FIG. 3 shows the measure (1). The reforming capability of the reformer 5 may be maintained by periodically exchanging the reforming catalyst.

Like the embodiment of FIG. 2, in the embodiment of FIG. 3, the gas from the fuel electrode of the upstream fuel cell I is introduced to the reformer 5 from the gas entrance 8 by the upstream anode gas line 11a and part of its heat is consumed for the reformation in the reformer 5. Then, the cooled gas flows into the anode exhaust gas line 11b from the gas exit 9. Therefore, no combustion takes place in the reformer 5. In terms of heat, the reformation occurs with the sensible heat of the gas from the fuel electrode of the upstream fuel cell I. This improves the reforming conversion ratio and saves the space for system installation.

Figure 4:
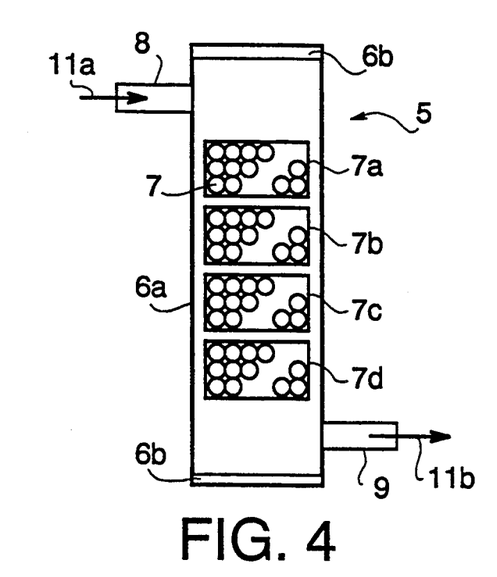
FIG. 4 is a view showing still another example of the reformer of the present invention.

FIG. 4 also shows a modification of the second reformer 5, which has a structure similar to that shown in FIG. 3. In FIG. 4, the reforming catalyst 7 is divided into several groups 7a, 7b, 7c and 7d in the longitudinal direction of the container main body 6. Therefore, it is possible to replace a particular damaged one group and leave the other non-damaged groups.

Figure 5A:
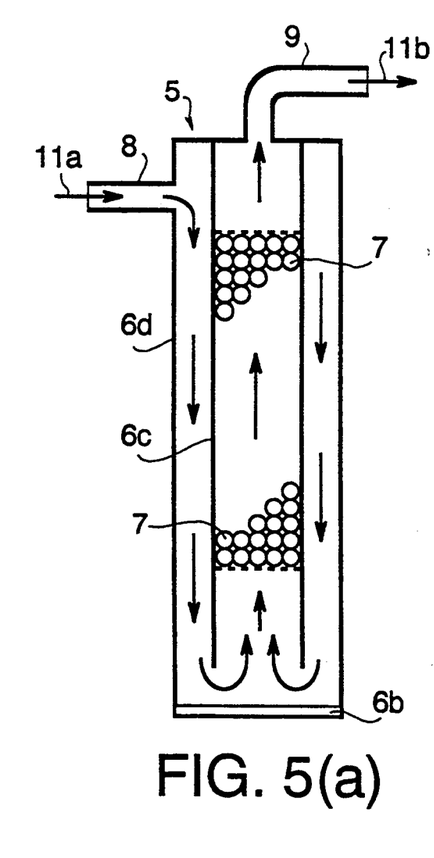
FIG. 5(a) illustrates a reformer of double cylinder structure, with an inner cylinder serving as a reforming chamber.

Referring to FIG. 5(a), illustrated is another embodiment of the present invention which provides the measure (2).

Specifically, a double cylinder structure is employed for the container 6 of the second reformer 5. An inner cylinder 6c is filled with the reforming catalyst 7 to define a reforming chamber. An outer cylinder 6d is provided with a gas entrance 8 at one end. The inner cylinder 6c is provided with a gas exit 9 at one other end. The other end (or bottom in the illustration) of the inner cylinder 6c is open so that the exhaust gas admitted from the gas entrance 8 flows in the outer cylinder 6d and then into the inner cylinder 6c (180-degree turn at the bottom in the container 6) to cause the regenerative heat exchange. The regenerative heat exchange maintains the reformer exit temperature at a high value.

Figure 5B:
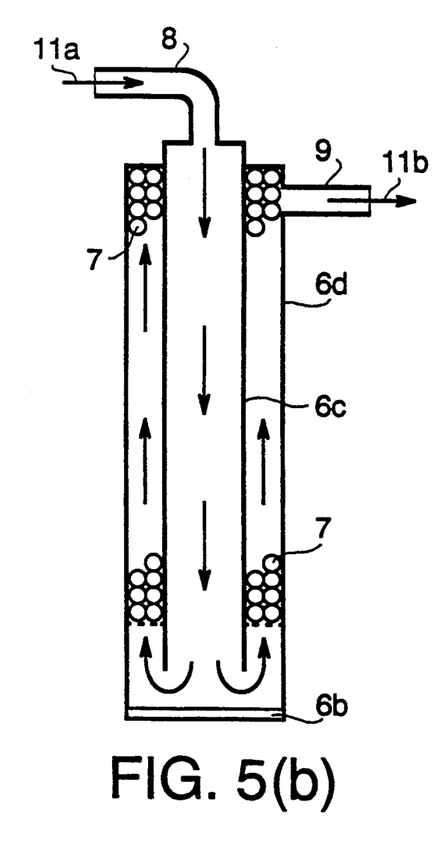
FIG. 5(b) shows a similar reformer with a space between inner and outer cylinders serving as the reforming chamber.

FIG. 5(b) shows a modification of the reformer 5 shown in FIG. 5(a). The space between the inner and outer cylinders 6c and 6d is filled with the reforming catalyst 7 to form the reforming chamber. The gas entrance 8 is formed at the top of the inner cylinder 6c and the gas exit 9 is formed at the top of the outer cylinder 6d. The anode exhaust gas admitted from the gas entrance 8 flows in the inner cylinder 6c from the top to the bottom and then into the outer cylinder 6d for the regenerative heat exchange.

Figure 6:
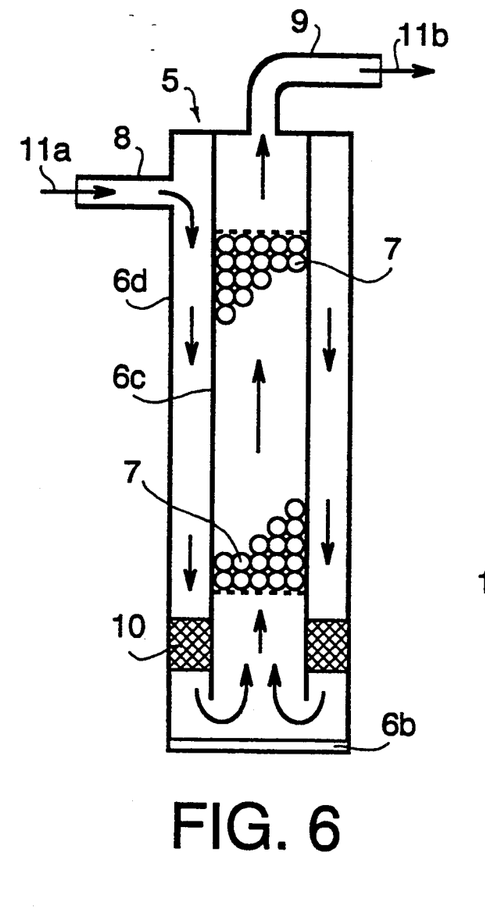
FIG. 6 illustrates yet another example of the reformer of the present invention.

Referring to FIG. 6, which is similar to FIG. 5(a), a carbonate absorber 10 of ring shape is placed between the inner and outer cylinders 6c and 6d in the bottom area of the container 6. The carbonate absorber 10 is a felt made from ceramic. A lid 6b is detachably mounted on the bottom of the outer cylinder 6d.

The gas of about 700° C. enters the space between the inner and outer cylinders 6c and 6d from the gas entrance 8 and proceeds to the carbonate absorber 10 placed at the bottom of the cylindrical space. The carbonate vapor contained in the gas contacts the carbonate absorber 10 and is cooled below 500° C. This cooling condenses the carbonate vapor and the carbonate is removed from the gas. The gas which does not include the carbonate vapor is then introduced to the inner cylinder 6c (or reforming chamber) and flows toward the gas exit 9 while contacting the reforming catalyst 7. Meantime, the gas flowing upward in the inner cylinder 6c heats the gas flowing downward in the cylindrical space between the inner and outer cylinders 6c and 6d so that a heat exchange occurs. As a result, the gas in the inner cylinder 6c receives the heat. In the inner cylinder 6c, accordingly, the reformation is caused at a temperature of about 600°–700° C. and the sensible heat of the gas flowing in the cylindrical space is used as the heat source in this reformation. The inner cylinder 6c may elongate or shrink due to the temperature difference during the reforming reaction. To prevent a trouble relating to this elongation or shrinkage, the bottom of the inner cylinder 6c is free to move.

Figure 7:
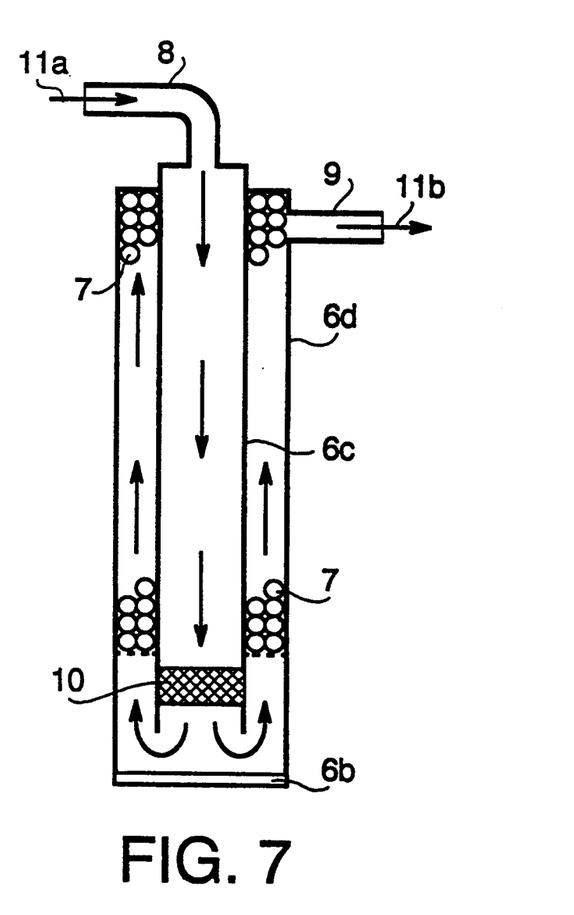
FIG. 7 shows a modification of the reformer of FIG. 6.

FIG. 7 depicts a modification of the reformer 5 of FIG. 6 which is similar to FIG. 5(b). The reforming catalyst 7 is placed between the cylindrical space between the two cylinders 6c and 6d to form the reforming chamber, the carbonate absorber 10 is provided at the bottom of the container 6, the gas entrance 8 is formed at the top of the inner cylinder 6c and the gas exit 9 is formed at the top of the outer cylinder 6d.

In this embodiment, it is possible to remove the carbonate vapor like FIG. 6 and improve the remaining methane reforming efficiency.

Figure 8:
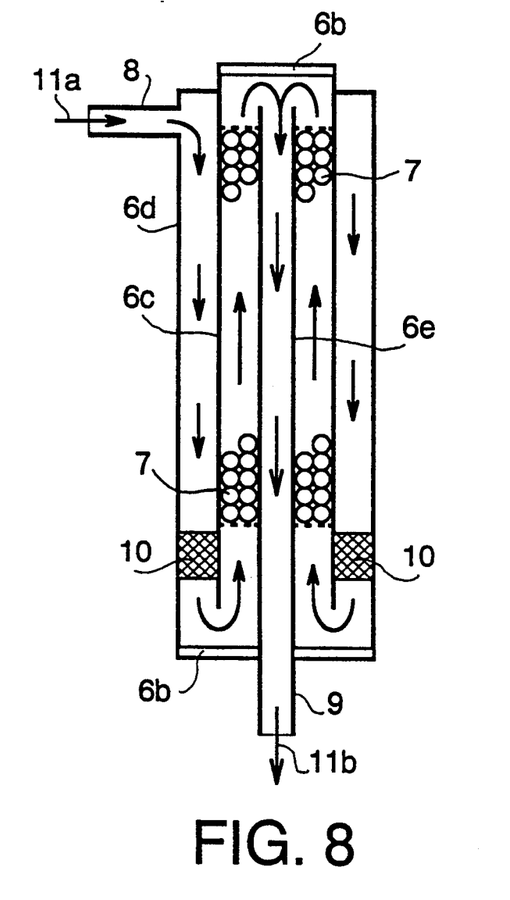
FIG. 8 shows another modification of the reformer of FIG. 6.

Referring to FIG. 8, illustrated is still another embodiment of the present invention which is similar to FIG. 6. As compared with FIG. 6, a center pipe 6e coaxially extends in the inner cylinder 6c. The top of the center pipe 6e is open and free while the bottom is supported by a lid 6b. The space between the center pipe 6e and the inner pipe 6c is filled with the reforming catalyst 7 to define the reforming chamber. The top of the center pipe 6e communicates with the top of the inner cylinder 6c that the gas which has flowed through the reforming chamber enter the center pipe 6e. As illustrated, the gas in the center pipe 6e flows in the opposite direction as the gas in the inner cylinder 6c.

In FIG. 8, the lid 6b is provided at the bottom of the outer cylinder 6d for the loading and unloading of the reforming catalyst 7.

In this embodiment, if the hot gas (e.g., 680° C.) is admitted to the space between the outer and inner cylinders 6d and 6c from the gas entrance 8, it flows downward and passes through the carbonate absorber 10. The gas is cooled to 470° C. or less at the carbonate absorber 10 and the carbonate vapor among the gas is condensed. The gas from which the carbonate vapor has been removed now flows upward toward the top of the inner cylinder 6c while contacting the reforming catalyst 7. During this upward movement, the gas in the inner cylinder 6c is heated by the gas flowing in the outer cylinder 6d. This heating contributes to the reforming reaction in the inner cylinder 6d and the methane remaining in the gas is reduced by the reforming reaction in the inner cylinder 6c. Then, the gas flows into the center pipe 6e from the inner cylinder 6c at a temperature of about 660° C. The sensible heat of the gas in the center pipe 6e is given to the reforming chamber so that the gas temperature drops to about 500° C. at the center pipe exit 9.

The inner cylinder 6c and the center pipe 6e may shrink respectively due to the temperature difference during the reforming reaction, but one end of the center pipe 6e and that of the inner cylinder 6c are free to move so that troubles can be avoided.

FIG. 9 shows a modification of FIG. 8. Specifically, the gas entrance 8 and the gas exit 9 are reversed in this embodiment.

The gas from the fuel electrode 4 of the upstream fuel cell I enters the center pipe 6e from the entrance 8 and passes through the carbonate absorber 10 placed in the center pipe 6e. The gas is cooled to 470° C. or less by the carbonate absorber 10 so that the carbonate vapor in the gas is condensed. Then, the gas free from the carbonate vapor proceeds into the space between the center pipe 6e and the inner cylinder 6c and contacts the reforming catalyst 7 to be reformed. During the reformation, the gas in the space between the center pipe and the inner cylinder 6c is given heat from the gas flowing in the center pipe 6e. The gas which has passed through the space between the center pipe and the inner cylinder 6c contains a reduced amount of methane and has a temperature of about 660° C. Then, the gas flows into the space between the outer and inner cylinders 6d and 6c. During the downward flow, the sensible heat of the gas in the space between the inner and outer cylinders is transferred to the reforming chamber (space between the center pipe and the inner cylinder) and the temperature of the gas drops to about 500° at the exit 9.

The foregoing description deals with cases where the second reformer 5 is used for a molten carbonate fuel cell power generation system, but the teaching of the present invention may be applied to other types of fuel cell which produces H₂O in the fuel cell reaction at the fuel electrode (e.g., solid electrolyte fuel cell). In addition, only one reformer 5 is provided in the embodiments, but another or more reformers 5 may be provided downstream of the first second reformer 5 or the fuel cell II. Further, the second reformer 5 may be placed upside down or laid.

Moreover, the second fuel cell I may be replaced by a hydrogen consuming device such as a methanol composing device. It should be noted that this also falls in the scope of the present invention.

The second reformer 5 of the present invention is characterized by the use of the sensible heat of the anode exhaust gas itself. However, a certain amount of heat may be supplied from outside and such a case also falls in the scope of the present invention. Various methods are available to supply the heat.

According to the present invention, the non-reformed raw material gas contained in the gas discharged from the fuel electrode 4 of the first fuel cell I is further reformed in the second reformer 5 with the steam produced upon the reaction at the fuel electrode 4 and the sensible heat of the gas discharged from the fuel electrode 4 so that the amount of remaining raw material gas is reduced and the total reforming conversion ratio is improved. As a result, a high reforming conversion ratio is realized without raising the reforming temperature of the main reformer 1 even if the system pressure is high. Further, the second reformer has a simple structure, i.e., it includes a container having a reforming chamber filed with a reforming catalyst. The loading and unloading of the reforming catalyst is easy since the second reformer has a lid. The reforming catalyst is divided into several blocks (e.g., 3–5 blocks) so that only damaged block can be replaced. Further, the carbonate absorber 10 is provided in the double-cylinder second reformer 5 so that the gas from which the carbonate vapor is removed is reformed in the second reformer 5 and the reforming catalyst is not damaged by the carbonate vapor. Moreover, the reforming temperature is maintained at approximately the same value as the temperature of the gas discharged from the fuel electrode of the fuel cell.

We claim:

1. A reformer arrangement for a fuel cell power generation system in which a raw material gas is reformed with steam to a fuel gas and the fuel gas is fed to a fuel electrode of a fuel cell for power generation, comprising:

a main reformer for reforming the raw material gas to the fuel gas;

a fuel cell for receiving the fuel gas to cause the power generation and to produce steam; and a second reformer for reforming with the steam non-reformed raw material gas discharged from the fuel electrode;

wherein the second reformer includes a cylindrical or tubular main body, an entrance for the gas discharged from the fuel electrode is formed at one end of the main body, an exit for the gas is formed at the other end of the main body, a reforming catalyst is placed in a space between the gas entrance and exit, and a lid is provided at one or both ends of the main body for loading and unloading of a reforming catalyst.

2. The arrangement of claim 1, wherein a reforming catalyst is placed in the second reformer, the gas discharged from the fuel electrode is introduced in the second reformer to contact the reforming catalyst and the reformation in the second reformer takes place with a sensible heat of the gas discharged from the fuel electrode.

3. The arrangement of claim 1, wherein an exit of the second reformer is connected with an anode of another fuel cell.

4. A reformer for reforming steam and non-reformed raw material gas contained in a gas discharged from a fuel electrode of a fuel cell, comprising:

a reforming catalyst; and a container including an outer cylinder, an inner cylinder extending in the outer cylinder and a center pipe extending in the inner cylinder, one end of the inner cylinder being communicated with one end of the outer cylinder on one side of the container and the other end of the inner cylinder being communicated with one end of the center pipe on the other side of the container to define a passage through the outer cylinder, the inner cylinder and the center pipe, the passage including a first gas passage formed between the outer and inner cylinders for introducing the gas discharged from the fuel electrode into the container, a second gas passage formed between the inner cylinder and the center pipe for holding the reforming catalyst and a third gas passage formed in the center pipe for discharging the gas from the container.

5. The reformer of claim 4, further including an absorber for absorbing a carbonate vapor contained in the gas discharged from the fuel electrode, the absorber being placed in an inner and outer cylinder connection area in the container.

6. The reformer of claim 5, further including a lid at one or both ends of the inner and/or outer cylinder for loading and unloading of the reforming catalyst.

7. A reformer for reforming steam and non-reformed raw material gas contained in a gas discharged from a fuel electrode of a fuel cell, comprising:
  a reforming catalyst; and
  a container including an outer cylinder, an inner cylinder extending in the outer cylinder and a center pipe extending in the inner cylinder, one end of the inner cylinder being communicated with one end of the center pipe on the other side of the container to define a passage through the outer cylinder, the inner cylinder and the center pipe, the passage including a first gas passage formed in the center pipe for introducing the gas discharged from the fuel electrode into the container, a second gas passage formed between the inner cylinder and the center pipe for holding the reforming catalyst and a third gas passage formed between the inner and outer cylinders for discharging the gas from the container.

8. The reformer of claim 7, further including an absorber for absorbing a carbonate vapor contained in the gas discharged from the fuel electrode, the absorber being placed in the center pipe at its exit.

9. The reformer of claim 8, further including a lid at one or both ends of the inner and/or outer cylinder for loading and unloading of the reforming catalyst.

10. A reformer arrangement for a fuel cell power generation system in which a raw material gas is reformed with steam to a fuel gas and the fuel gas is fed to a fuel electrode of a fuel cell for power generation, comprising:
  a main reformer for reforming the raw material gas to the fuel gas;
  a fuel cell for receiving the fuel gas to cause the power generation and to produce steam; and
  a second reformer for reforming with the steam non-reformed raw material gas discharged from the fuel electrode;
  wherein the reforming catalyst is divided into several blocks in the main body of the second reformer so that a block which is damaged by a carbonate is replaceable by new one.

11. The arrangement of claim 10, wherein a reforming catalyst is placed in the second reformer, the gas discharged from the fuel electrode is introduced in the second reformer to contact the reforming catalyst and the reformation in the second reformer takes place with a sensible heat of the gas discharged from the fuel electrode.

12. The arrangement of claim 10, wherein an exit of the second reformer is connected with an anode of another fuel cell.

13. A reformer arrangement for a fuel cell power generation system in which a raw material gas is reformed with steam to a fuel gas and the fuel gas is fed to a fuel electrode of a fuel cell for power generation, comprising:
  a main reformer for reforming the raw material gas to the fuel gas;
  a fuel cell for receiving the fuel gas to cause the power generation and to produce steam; and
  a second reformer for reforming with the steam non-reformed raw material gas discharged from the fuel electrode;
  wherein the second reformer has a double-cylinder structure, the reforming catalyst is placed in an inner cylinder or a space between the inner and outer cylinders, the inner cylinder or the space which does not carry the reforming catalyst is used as a passage for discharging the gas from the second reformer, and one end of the inner cylinder is communicated with one end of the outer cylinder so that the gas flows into the inner cylinder or the space carrying the reforming catalyst and then the space or the inner cylinder not carrying the catalyst, before its exits from the second reformer.

14. The arrangement of claim 13, wherein a reforming catalyst is placed in the second reformer, the gas discharged from the fuel electrode is introduced in the second reformer to contact the reforming catalyst and the reformation in the second reformer takes place with a sensible heat of the gas discharged from the fuel electrode.

15. The arrangement of claim 13, wherein an exit of the second reformer is connected with an anode of another fuel cell.

16. The arrangement of claim 13, wherein an absorber for absorbing a carbonate vapor contained in the gas discharged from the fuel electrode is placed at an inner-outer cylinder connection area in the second reformer.

* * * * *

UNITED STATES PATENT AND TRADEMARK OFFICE
CERTIFICATE OF CORRECTION

PATENT NO. : 5,346,779
DATED : September 13, 1994
INVENTOR(S) : Kenzo Nakazawa

It is certified that error appears in the above-indentified patent and that said Letters Patent is hereby corrected as shown below:

Column 1, line 46, "$C_4$ ($C_4$" should be -- $CH_4$ ($CH_4$--.

Column 1, line 53, "$\rightarrow CO_3{-}$" should be -- $\rightarrow CO_3{--}$ --.

Column 1, line 56, "$CO_3{-}$" should be --$CO_3{--}$--.

Column 1, line 57, "$CO_3{-}$" should be --$CO_3{--}$--.

Column 1, line 61, "$CO_3{-}+$" should be --$CO_3{--}+$ --.

Column 2, lines 40-41, "reformer proceed" should be --reformer 1 proceed--.

Signed and Sealed this

Eleventh Day of April, 1995

Attest:

BRUCE LEHMAN

*Attesting Officer*  *Commissioner of Patents and Trademarks*